United States Patent [19]

Eichenauer

[11] Patent Number: 5,883,190
[45] Date of Patent: Mar. 16, 1999

[54] THERMOPLASTIC MOULDING COMPOSITIONS OF THE ABS TYPE

[75] Inventor: Herbert Eichenauer, Dormagen, Germany

[73] Assignee: Bayer AG, Germany

[21] Appl. No.: 975,568

[22] Filed: Nov. 21, 1997

[30] Foreign Application Priority Data

Nov. 28, 1996 [DD] German Dem. Rep. ....... 196 49 249.1

[51] Int. Cl.$^6$ ..................................................... C08L 55/02
[52] U.S. Cl. ................................ 525/71; 525/73; 525/84; 525/86; 525/64; 525/66; 525/67
[58] Field of Search ................................. 525/64, 66, 67, 525/71, 316, 86, 84, 73

[56] References Cited

U.S. PATENT DOCUMENTS

| 4,430,478 | 2/1984 | Schmitt et al. | 525/71 |
|---|---|---|---|
| 4,713,420 | 12/1987 | Henton | 525/236 |
| 4,731,420 | 3/1988 | Hefner, Jr. | 525/430 |
| 5,605,963 | 2/1997 | Leitz et al. | 525/71 |
| 5,719,232 | 2/1998 | Schmidt et al. | 525/86 |
| 5,741,853 | 4/1998 | Eichenauer et al. | 525/71 |

FOREIGN PATENT DOCUMENTS

| 109 884 | 8/1986 | European Pat. Off. . |
|---|---|---|
| 470 229 | 2/1991 | European Pat. Off. . |
| 436 381 | 7/1991 | European Pat. Off. . |
| 2420 357 | 12/1975 | Germany . |
| WO 89/05836 | 6/1989 | WIPO . |
| WO 91/15544 | 10/1991 | WIPO . |

OTHER PUBLICATIONS

European Search Report for related foreign application EP 97 12 0061 (Jun. 18, 1998).

*Primary Examiner*—Mark L. Warzel
*Attorney, Agent, or Firm*—Connolly & Hutz

[57] ABSTRACT

Thermoplastic moulding compositions containing
I) At least one graft polymer which is obtainable by emulsion polymerisation of for example styrene and acrylonitrile under special conditions,
II) At least one graft polymer that can be obtained by solution, bulk or suspension polymerisation of for example styrene and acrylonitrile in the presence of a rubber,
III) At least one rubber-free copolymer of for example styrene and acrylonitrile,
and their use for producing mouldings.

6 Claims, No Drawings

THERMOPLASTIC MOULDING COMPOSITIONS OF THE ABS TYPE

ABS moulding compositions have already been widely used for many years as thermo-plastic resins for producing mouldings of all types. The property spectrum of these resins ranges from relatively brittle to extremely tough.

A special area of use of ABS moulding compositions is in the production of mouldings able to meet stringent requirements as regards impact toughness, especially even at low temperatures, as well as the possibility of achieving a specific adjustment (gradations ranging between shiny and matt) of the surface gloss (for example in the automobile sector or for manufacturing parts of casings and housings).

ABS products having high toughness and relatively high surface gloss can be obtained by introducing large amounts of rubber when using conventional emulsion ABS; however, these desirable properties are combined with disadvantages as regards other properties, for example the modulus of elasticity, heat resistance and thermoplastic flowability.

ABS products having relatively low surface gloss can be produced for example by solution or bulk polymerisation processes; however, products having good low temperature toughness properties cannot be obtained by these processes.

Although specific improvements can be achieved by mixing conventional emulsion ABS types with solution or bulk polymerisation ABS types (see for example U.S. Pat. No. 4,430,478), these materials do not meet the stringent toughness and flowability requirements while simultaneously preserving the low surface gloss typical of bulk polymerisation ABS.

It is also known to mix ABS polymers produced by bulk polymerisation with various graft rubber polymers having small and large particle sizes produced by emulsionpolymerisation (see for example U.S. Pat. No. 4,430,478, U.S. Pat. No. 4,713,420, EP 190 884, EP 390 781, EP 436 381 and the literature cited therein), though the resulting products do not have improved low-temperature toughness.

It has now been found that products having excellent toughness properties, especially very high low-temperature toughness values, can be obtained by combining special graft polymers produced by emulsion polymerisation with ABS polymers produced by solution, bulk or suspension polymerisation.

The present invention provides improved thermoplastic moulding compositions of the ABS type, containing I) At least one graft polymer which is obtainable by emulsion polymerisation of styrene and acrylonitrile in a weight ratio of 90:10 to 50:50, wherein the styrene and/or acrylonitrile can be wholly or partially replaced by α-methyl styrene, methyl methacrylate or N-phenyl maleimide, in the presence of a mixture of a butadiene polymer latex (A) having a particle diameter $d_{50} \leq 320$ nm, preferably 260 to 310 nm, a particle diameter distribution width (measured as $d_{90}-d_{10}$ of the overall particle diameter distribution) of 30 to 100 nm, preferably 40 to 80 nm, and a gel content of $\leq 70\%$, preferably 40 to 65 wt. %, and a butadiene polymer latex (B) having a particle diameter $d_{50} \geq 370$ nm, preferably 380 to 450 nm, a particle diameter distribution width (measured as $d_{90}-d_{10}$ of the overallparticle diameter distribution) of 50 to 500 nm, preferably 100 to 400 nm, and a gel content $\geq 70$ wt. %, preferably 75 to 90 wt. %, the butadiene polymer latices in each case containing 0 to 50 wt. % of a further vinyl monomer incorporated by co-polymerisation and the mass ratio of graft monomers used to butadiene polymers used being 25:75 to 70:30, II) At least one graft polymer which is obtainable by solution, bulk or suspension polymerisation of styrene and acrylonitrile in a weight ratio of 90:10 to 50:50, the styrene and/or acrylonitrile being able to be replaced wholly or partially by α-methyl styrene, methyl methacrylate or N-phenyl maleimide, in the presence of a rubber, the rubber containing 0 to 50 wt. % of a further vinyl monomer incorporated by copolymerisation and the mass ratio of graft monomers used to rubber used being 50:50 to 97:3, preferably 70:30 to 95:5, and optionally III) At least one rubber-free copolymer of styrene and acrylonitrile in a weight ratio of 90:10 to 50:50, the styrene and/or acrylonitrile being able to be replaced wholly or partially by α-methyl styrene, methyl methacrylate or N-phenyl maleimide.

In general the moulding compositions according to the invention may contain:

1 to 50 parts by weight, preferably 2.5 to 45 parts by weight, and particularly preferably 5 to 40 parts by weight of I 50 to 99 parts by weight, preferably 55 to 97.5 parts by weight, and particularly preferably 60 to 95 parts by weight of II 0 to 100 parts by weight, preferably 0 to 80 parts by weight, and particularly preferably 0 to 60 parts by weight of III.

The moulding compositions according to the invention may also contain further rubber-free thermoplastic resins not formed from vinyl monomers.

The further thermoplastic resins not formed from vinyl monomers may be added in amounts of 0 to 500 parts by weight, referred to 100 parts by weight of I+II+III.

A mixture of at least two butadiene polymer latices, at least one each of type (A) and (B), is used in the graft polymerisation to prepare the component I). The weight ratio (A):(B) is preferably 90:10 to 10:90, particularly preferably 60:40 to 30:70, referred to the respective solids proportion of the latices.

The butadiene polymer latices (A) and (B) may be prepared by emulsion polymerisation of butadiene. This polymerisation is known and is described for example in Houben-Weyl, Methoden der Organischen Chemie, Makromoleculare Stoffe, Part 1, p. 674 (1961), Thieme Verlag Stuttgart. Up to 50 wt. % (referred to the total amount of monomers used in the butadiene polymerisation) of one or more monomers copolymerisable with butadiene may be used as comonomers.

Examples of such monomers are isoprene, chloroprene, acrylonitrile, styrene, α-methyl styrene, $C_1$–$C_4$-alkyl styrenes, $C_1$–$C_8$-alkyl acrylates, $C_1$–$C_8$-alkyl methacrylates, alkylene glycol diacrylates, alkylene glycol dimethacrylates, divinyl benzene; butadiene is preferably used alone. It is also possible to prepare first of all a finely particulate butadiene polymer according to known methods and then agglomerate the latter in a known manner in order to adjust the required particle diameter.

Appropriate techniques have been described (see for example EP-PS 0 029 613; EP-PS 0 007 810; DD-PS 144 415; DE-AS 1 233 131; DE-AS 1 258 076; DE-OS 2 101 650; U.S. Pat. No. 1,379,391).

The so-called seed polymerisation technique can also be used, in which a finely particulate butadiene polymer is first of all prepared and is then polymerised further to form larger particles by further conversion with butadiene-containing monomers.

In principle the butadiene polymer latices (A) and (B) can also be prepared by emulsifying finely particulate butadiene polymers in aqueous media (see for example Japanese patent application 55 125 102).

The butadiene polymer latex (A) has a mean particle diameter $d_{50} \leq 320$ nm, preferably 260 to 310 nm, a particle diameter distribution width (measured as $d_{90}-d_{10}$ of the overall particle diameter distribution) of 30 to 100 nm, preferably 40 to 80 nm, and a gel content $\leq 70$ wt. %, preferably 40 to 65 wt. %.

The butadiene polymer latex (B) has a mean particle diameter $d50 \geq 370$ nm, preferably 380 to 450 nm, a particle diameter distribution width (measured as $d_{90}-d_{10}$ of the overall particle diameter distribution) of 50 to 500 nm, preferably 100 to 400 nm, and a gel content $\geq 70$ wt. %, preferably 75 to 90 wt. %.

The mean particle diameter $d_{50}$ as well as the $d_{10}$- and $d_{90}$- can be determined by ultracentrifuge measurements (see for example W. Scholtan, H. Lange: Kolloid Z. u. Z. Polymere 250, p. 782 to 796 (1972)), the specified values for the gel content referring to the determination according to the wire cage method in toluene (see Houben-Weyl, Methoden der Organischen Chemie, Makromolekulare Stoffe, Part 1, p. 307 (1961), Thieme Verlag Stuttgart).

The gel contents of the butadiene polymer latices (A) and (B) can in principle be adjusted in a known manner by employing suitable reaction conditions (for example high reaction temperature and/or polymerisation up to high conversion levels, as well as optionally addition of crosslinking substances in order to achieve a high gel content, or for example low reaction temperature and/or discontinuation of the polymerisation reaction before the occurrence of too great a degree of cross-linking, as well as optionally the addition of molecular weight regulators, for example n-dodecyl mercaptan or t-dodecyl mercaptan in order to achieve a low gel content). Emulsifiers that may be used include the conventional anionic emulsifiers such as alkyl sulphates, alkyl sulphonates, aralkyl sulphonates, soaps of saturated or unsaturated fatty acids, and also alkaline disproportionated or hydrogenated abietic or tall oil acids, emulsifiers containing carboxyl groups preferably being used (for example salts of $C_{10}$–$C_{18}$ fatty acids, disproportionated abietic acid).

The graft polymerisation can be carried out in such a way that the monomer mixture is continuously added to the mixture of the butadiene polymer latices (A) and (B) and is polymerised.

Special monomer:rubber ratios are preferably maintained and the monomers are added in a known manner to the rubber latex.

In order to produce the component I) according to the invention, preferably 25 to 70 parts by weight, particularly preferably 30 to 60 parts by weight, of a mixture of styrene and acrylonitrile that may optionally contain up to 50 wt. % (referred to the total amount of monomers used in the graft polymerisation) of one or more monomers are polymerised in the presence of preferably 30 to 75 parts by weight, particularly preferably 40 to 70 parts by weight (in each case referred to solids) of the butadiene polymer latex mixture of (A) and (B).

The monomers used in this graft polymerisation are preferably mixtures of styrene and acrylonitrile in a weight ratio of 90:10 to 50:50, particularly preferably in a weight ratio of 65:35 to 75:25, the styrene and/or acrylonitrile being able to be replaced wholly or partially by copolymerisable monomers, preferably by α-methyl styrene, methyl methacrylate or N-phenyl maleimide.

In addition molecular weight regulators may be used in the graft polymerisation, preferably in amounts of 0.05 to 2 wt. %, particularly preferably in amounts of 0.1 to 1 wt. % (in each case referred to the total amount of monomer in the graft polymerisation stage). Suitable molecular weight regulators include for example alkyl mercaptans such as n-dodecyl mercaptan, t-dodecyl mercaptan; dimeric α-methyl styrene; terpinolene.

Suitable initiators include inorganic and organic peroxides, for example $H_2O_2$, ditert.-butyl peroxide, cumene hydroperoxide, dicyclohexyl percarbonate, tert.-butyl hydroperoxide, p-menthane hydroperoxide, azo initiators such as azobis-isobutyronitrile, inorganic per salts such as ammonium, sodium or potassium persulphate, potassium perphosphate, sodium perborate, as well as redox systems. Redox systems generally consist of an organic oxidising agent and a reducing agent, the reaction medium in addition preferably containing heavy metal ions (see Houben-Weyl, Methoden der Organischen Chemie, Vol. 14/1, pp. 263 to 297).

The polymerisation temperature is 25° C. to 160° C., preferably 40° C. to 90° C. Suitable emulsifiers are mentioned above.

In order to produce the component I) according to the invention, the graft polymerisation may preferably be carried out by adding the monomers in such a way that 55 to 90 wt. %, preferably 60 to 80 wt. % and particularly preferably 65 to 75 wt. % of the total amount of monomers used in the graft polymerisation are metered in within the first half of the total monomer addition time, the remaining monomer fraction being metered in within the second half of the total monomer addition time.

The preparation of the component II) is known (see for example DE-OS 1 300 241, DE-OS 2 659 175, EP 67 536, EP 103 657, EP 412 801, EP 505 798, US 4 252 911, U.S. Pat. No. 4 362 850, U.S. Pat. No. 5 286 792, as well as the literature cited therein).

Styrene and acrylonitrile may be polymerised in a weight ratio of 90:10 to 50:50, preferably in a weight ratio of 65:35 to 75:25, the styrene and/or acrylonitrile being able to be wholly or partially replaced by copolymerisable monomers, preferably by α-methyl styrene, methyl methacrylate or N-phenyl maleimide, in the presence of a soluble rubber according to known methods of solution, bulk or suspension polymerisation.

Rubbers having a glass transition temperature $\leq 10°$ C. are used, preferred rubbers being polybutadiene, butadiene/styrene copolymers (for example statistical copolymers, block copolymers, star copolymers), butadiene/acrylonitrile copolymers, and polyisoprene.

Particularly preferred rubbers for producing the component II) are polybutadiene and butadiene/styrene copolymers.

The rubber contents of the component II) according to the invention are 3 to 50 wt. %, preferably 5 to 30 wt. %, and particularly preferably 6 to 25 wt. %.

The rubbers are present in the component II) in the form of rubber phases having mean particle diameters of ca. 100 nm to more than 10 000 nm, and ABS polymers having mean particle diameters of the rubber phase of 200 nm up to 5000 nm, particularly preferably 400 nm up to 2000 nm, are preferably used.

The rubber-free copolymers III) that are optionally additionally used are preferably copolymers of styrene and acrylonitrile in a weight ratio of 90:10 to 50:50, the styrene and/or acrylonitrile being able to be replaced wholly or partially by α-methyl styrene, methyl methacrylate or N-phenyl maleimide.

These copolymers preferably have a mean molecular weight $M_W$ of 20 000 to 200 000 or limiting viscosities (η) of 20 to 110 ml/g measured in dimethyl formamide at 25° C.).

Details of the preparation of these resins are described for example in DE-AS 2 420 358 and DE-AS 2 724 360. Vinyl resins produced by bulk or solution polymerisation have proved particularly suitable.

Besides thermoplastic resins formed from vinyl monomers, it is also possible to use polycondensates, for example aromatic polycarbonates, aromatic polyester carbonates, polyesters or polyamides, as rubber-free copolymer in the moulding compositions according to the invention.

Suitable thermoplastic polycarbonates and polyester carbonates are known (see for example DE-AS 1 495 626, DE-OS 2 232 877, DE-OS 2 703 376, DE-OS 2 714 544, DE-OS 3 000 610, DE-OS 3 832 396, DE-OS 3 077 934), and can be obtained for example by reacting diphenols of the formulae (I) and (II)

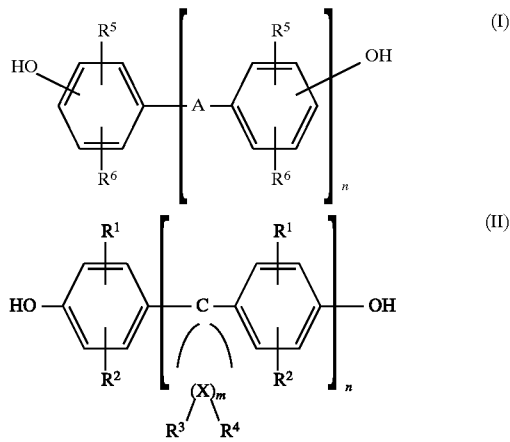

wherein

A is a single bond, $C_1$–$C_5$-alkylene, $C_2$–$C_5$-alkylidene, $C_5$–$C_6$-cycloalkylidene, —O—, —S—, —SO—, —$SO_2$ or —CO—, $R^5$ and $R^6$ denote, independently of one another, hydrogen, methyl or halogen, especially hydrogen, methyl, chloride or bromine, $R^1$ and $R^2$ denote, independently of one another, hydrogen, halogen, preferably -chlorine or bromine, $C_1$–$C_5$-alkyl, preferably methyl, ethyl, $C_5$–$C_6$-cycloaklyl, preferably cyclohexyl, $C_6$–$C_{10}$-aryl, preferably phenyl, or $C_7$–$C_{12}$-aralkyl, preferably phenyl-$C_1$–$C_4$-alkyl, especially benzyl, m is an integer from 4 to 7, preferably 4 or 5, n is 0 or 1, $R^3$ and $R^4$ can be chosen individually for each X and denote, independently of one another, hydrogen or $C_1$–$C_6$-alkyl, and X denotes carbon, with carbonic acid halides, preferably phosgene, and/or with aromatic dicarboxylic dihalides, preferably benzene dicarboxylic acid dihalides, by phase boundary polycondensation or with phosgene by polycondensation in homogeneous phase (the so-called pyridine method), the molecular weight being able to be adjusted in a known manner by a suitable amount of known chain terminators.

Suitable diphenols of the formulae (I) and (II) include for example hydroquinone, resorcinol, 4,4'-dihydroxydiphenyl, 2,2-bis-(4-hydroxyphenyl)-propane, 2,4-bis-(4-hydroxyphenyl)-2-methylbutane, 2,2-bis-(4-hydroxy-3,5-dimethylphenyl)-propane, 2,2-bis-(4-hydroxy-3,5-dichlorophenyl)-propane, 2,2-bis-(4-hydroxy-3,5-dibromophenyl)-propane, 1,1-bis-(4-hydroxyphenyl)-cyclohexane, 1,1-bis-(4-hydroxy-phenyl)-3,3,5-trimethylcyclohexane, 1,1-bis(4-hydroxyphenyl)-3,3-dimethylcyclo-hexane, 1,1-bis-(4-hydroxyphenyl)-3,3,5,5-tetramethylcyclohexane or 1,1-bis-(4-hydroxyphenyl)-2,4,4-trimethylcyclopentane.

Preferred diphenols of the formula (I) are 2,2-bis(4-hydroxyphenyl)-propane and 1,1-bis(4-hydroxyphenyl)-cyclohexane, and the preferred phenol of the formula (II) is 1,1-bis-(4-hydroxyphenyl)-3,3,5-trimethylcyclohexane.

Mixtures of diphenols may also be used.

Suitable chain terminators are for example phenol, p-tert.-butylphenol, long-chain alkylphenols such as 4-(1,3-tetramethyl-butyl)phenol according to DE-OS 2 842 005, monoalkylphenols, dialkylphenols with a total of 8 to 20 C-atoms in the alkyl substituents according to DE-OS 3 506 472, such as p-nonylphenol, 2,5-di-tert.-butylphenol, p-tert.-octylphenol, p-dodecylphenol, 2-(3,5-dimethylheptyl) phenol and 4-(3,5-dimethylheptyl)phenol. The necessary amount of chain terminators is in general 0.5 to 10 mole %, referred to the sum of the diphenols (I) and (II).

The suitable polycarbonates or polyester carbonates, may be linear or branched; branched products are preferably obtained by incorporating 0.05 to 2.0 mole %, reaction referred to the sum of the diphenols used, of trifunctional or higher polyfunctional compounds, for example those having three or more than three phenolic OH-groups.

The suitable polycarbonates or polyester carbonates may contain aromatically bound halogen, preferably bromine and/or chlorine, but are preferably halogen-free.

The polycarbonates and polyester carbonates have mean molecular weights ($M_W$, weight average) determined for example by ultracentrifugation or light scattering measurements, of 10 000 to 200 000, preferably 20 000 to 80 000.

Suitable thermoplastic polyesters are preferably polyalkylene terephthalates, i.e. reaction products formed from aromatic dicarboxylic acids or their reactive derivatives (for example dimethyl esters or anhydrides) and aliphatic, cycloaliphatic or arylaliphatic diols and mixtures of such reaction products.

Preferred polalkylene terephthalates can be prepared from terephthalic acids (or their reactive derivatives) and aliphatic or cycloaliphatic diols having 2 to 10 C atoms according to known methods (Kunststoff-Handbuch, Vol. VIII, p. 695 ff, Carl Hanser Verlag, Munich, 1973).

In preferred polyalkylene terephthalates 80 to 100 mole %, preferably 90 to 100 mole %, of the dicarboxylic acid radicals and terephthalic acid radicals, and 80 to 100 mole %, preferably 90 to 100 mole %, of the diol radicals, are ethylene glycol radicals and/or butanediol-1,4 radicals.

The preferred polyalkylene terephthalates may contain, besides ethylene glycol or butanediol-1,4 radicals, 0 to 20 mole % of radicals of other aliphatic diols having 3 to 12 C atoms or cycloaliphatic diols having 6 to 12 C atoms, for example radicals of propanediol-1,3, 2-ethylpropanediol-1,3, neopentyl glycol, pentanediol-1,5, hexanediol-1,6, cyclohexanedimethanol-1,4, 3-methylpentanediol-1,3, and -1,6, 2-ethylhexanediol-1,3, 2,2-diethylpropanediol-1,3, hexanediol-2,5, 1,4-di(beta-hydroxyethoxy)benzene, 2,2-bis-4-hydroxycyclohexyl)propane, 2,4-dihydroxy-1,1,3,3-tetramethylcyclobutane, 2,2-bis-(3-beta-hydroxyethoxyphenyl)propane and 2,2-bis-(4-hydroxypropoxyphenyl)propane (DE-OS 2 407 647, 2 407 776, 2 715 932).

The polyalkylene terephthalates may be branched by incorporation of relatively small amounts of trihydric or tetrahydric alcohols or tribasic or tetrabasic carboxylic acids, such as are described in DE-OS 1 900 270 and U.S. Pat. No. 3,692,744. Examples of preferred branching agents are trimesic acid, trimellitic acid, trimethylolethane and trimethylolpropane, and pentarythritol. It is advisable to use not more than 1 mole % of the branching agent, referred to the acid component.

Particularly preferred are polyalkylene terephthalates that have been prepared solely from terephthalic acid and its reactive derivatives (for example its dialkyl esters) and ethylene glycol and/or butanediol-1,4, as well as mixtures of these polyalkylene terephthalates.

Preferred polyalkylene terephthalates are also copolyesters that have been prepared from at least two of the aforementioned alcohol components; particularly preferred copolyesters are poly(ethylene glycol butanediol-1,4) terephthalates.

The preferably suitable polyalkylene terephthalates generally have an intrinsic viscosity of 0.4 to 1.5 dl/g, preferably 0.5 to 1.3 dl/g, especially 0.6 to 1.2 dl/g, in each case measured in phenol/o-dichlorobenzene (1:1 parts by weight) at 25° C.

Suitable polyamides are known homopolyamides, copolyamides, and mixtures of these polyamides. These polyamides may be partially crystalline and/or amorphous.

Suitable partially crystalline polyamides are for example polyamide-6, polyamide-6,6, and mixtures and corresponding copolymers of these components. Also suitable are partially crystalline polyamides whose acid component consists wholly or partially of terephthalic acid and/or isophthalic acid and/or suberic acid and/or sebacic acid and/or azealic acid and/or adipic acid and/or cyclohexanedicarboxylic acid, whose diamine component consists wholly or partially of m- and/or p-xylylene diamine and/or hexamethylene diamine and/or 2,2,4-trimethylhexamethylene diamine and/or 2,4,4-trimethylhexamethylene diamine and/or isophorone diamine, and whose composition is in principle known.

There should also be mentioned polyamides that are prepared wholly or partially from lactams having 7 to 12 C atoms in the ring, optionally with the co-use of one or more of the aforementioned starting components.

Particularly preferred partially crystalline polyamides are polyamide-6 and polyamide-6,6 and their mixtures. Known products may be used as amorphous polyamides. Such polyamides are obtained by polycondensation of diamines such as ethylene diamine, hexamethylene diamine, decamethylene diamine, 2,2,4- and/or 2,4,4-trimethylhexamethylene diamine, m- and/or p-xylylene diamine, bis-(4-aminocyclohexyl)methane, bis-(4-aminocyclohexyl)propane, 3,3'-dimethyl-4,4'-diaminodicyclohexylmethane, 3-aminomethyl,3,5,5,-trimethylcyclohexylamine, 2,5- and/or 2,6-bis-(aminomethyl)norbornane and/or 1,4-diaminomethylcyclohexane with dicarboxylic acids such as oxalic acid, adipic acid, azelaic acid, decanedicarboxylic acid, heptadecanedicarboxylic acid, 2,2,4- and/or 2,4,4-trimethyladipic acid, isophthalic acid and terephthalic acid.

Also suitable are copolymers that are obtained by polycondensation of several monomers, as well as copolymers that are prepared by the addition of amino-carboxylic acids such as $\epsilon$-aminocaproic acid, ($\omega$-aminocaproic acid, $\omega$-aminolauric acid or their lactams.

Particularly preferred amorphous polyamides are the polyamides prepared from isophthalic acid, hexamethylene diamine and further diamines such as 4,4'-diaminodicyclohexylmethane, isophorone diamine, 2,2,4- and/or 2,4,4-trimethylhexamethylene diamine, 2,5- and/or 2,6-bis-(aminomethyl)norbornene, or from isophthalic acid, 4,4'-diaminodicyclohexylmethane and $\epsilon$-caprolactam, or from isophthalic acid, 3,3'-dimethyl-4,4'-diaminodicyclohexylmethane and laurinlactam, or from terephthalic acid and the isomeric mixture of 2,2,4- and/or 2,4,4-trimethylhexamethylene diamine.

Instead of pure 4,4'-diaminodicyclohexylmethane, mixtures of the positional isomeric diaminodicyclohexylmethanes may also be used, consisting of 70 to 99 mole % of the 4,4'-diamino isomer 1 to 30 mole % of the 2,4'-diamino isomer 0 to 2 mole % of the 2,2'-diamino isomer, and optionally, appropriately higher condensed amines that are obtained by hydrogenating industrial quality diaminodiphenylmethane. The isophthalic acid may be replaced in an amount of up to 30% by terephthalic acid.

The polyamides preferably have a relative viscosity (measured in a 1 wt. % solution in m-cresol at 25° C.) of 2.0 to 5.0, particularly preferably of 2.5 to 4.0.

Preferred moulding compositions according to the invention contain 1 to 50 parts by weight, preferably 2.5 to 45 parts by weight, and particularly preferably 5 to 40 parts by weight of graft polymer component I), and 50 to 99 parts by weight, preferably 55 to 97.5 parts by weight, and particularly preferably 60 to 95 parts by weight, of graft polymer component II).

If in addition copolymer component III) is used, the amount is up to 100 parts by weight, preferably up to 80 parts by weight and particularly preferably up to 60 parts by weight of component III).

The moulding compositions according to the invention are prepared by mixing the components I), II) and optionally III) in conventional mixing equipment (preferably in multiple roll mills, mixing extruders or internal mixers).

The necessary or advantageous additives, for example antioxidants, UV-stabilisers, peroxide destroyers, antistatic agents, lubricants, mould release agents, flame retardants, fillers or reinforcing agents (glass fibres, carbon fibres, etc.) and colouring agents may be added to the moulding compositions according to the invention during their preparation, further processing, working up and final forming.

The final forming can be carried out using conventional processing equipment and includes for example processing by injection moulding, sheet extrusion with optional subsequent thermoforming, cold forming, extrusion of pipes and profiled sections, and calendering.

In the following examples the specified parts are always parts by weight and the specified % values are always wt. %, unless otherwise stated.

EXAMPLES

Components

ABS graft polymer 1 (component I))

29 parts by weight (calculated as solids) of an anionically emulsified polybutadiene latex produced by free radical polymerisation and having a $d_{50}$ value of 282 nm, a $d_{90}$–$d_{10}$ value of 48 nm and a gel content of 49 wt. %, and 29 parts by weight (calculated as solids) of an anionically emulsified polybutadiene latex produced by free radical polymerisation and having a $d_{50}$ value of 432 nm, a $d_{90}$–$d_{10}$ value of 128 nm and a gel content of 81 wt. % are mixed with water to produce a solids content of ca. 20 wt. %, following which the mixture is heated to 63° C. and 0.5 part by weight of potassium peroxodisulphate (dissolved in water) is added. 42 parts by weight of a mixture of 73 wt. % of styrene and 27 wt. % of acrylonitrile and 0.1 part by weight of tert.- dodecyl mercaptan are then added within 4 hours in such a way that 70 wt. % of the total amount of monomer is added to the reaction mixture within the first two hours, and in parallel to this 1 part by weight (calculated as solids) of the sodium salt of a resin acid mixture (Dresinate 731, dissolved in water adjusted so as to be alkaline) is added over 4 hours. After a 4-hour post-reaction time and the addition of ca. 1.0 part by weight of a phenolic antioxidant, the graft latex is coagulated with a magnesium sulphate/acetic acid mixture, and after washing with water the resultant powder is dried at 70° C. in vacuo.

ABS graft polymer 2 (comparison material, not according to the invention)

The procedure described under "ABS graft polymer 1" was repeated, but instead of the polybutadiene latex mixture, 58 parts by weight (calculated as solids) of the. polybutadiene latex having a $d_{50}$ value of 282 nm, a $d_{90}-d_{10}$ value of 48 nm, and a gel content of 49 wt. % were used.

ABS graft polymer 3 (comparison material, not according to the invention)

The procedure described under "ABS graft polymer 1" was repeated, except that instead of the polybutadiene latex mixture, 58 parts by weight (calculated as solids) of the polybutadiene latex having a $d_{50}$ value of 432 nm, a $d_{90}-d_{10}$ value of 128 nm, and a gel content of 81 wt. % were used.

ABS graft polymer 4 (component II))

ABS Magnum 3504 (Dow) produced by bulk polymerisation and having a rubber content of ca. 10 wt. % and a mean particle diameter of the rubber phase of ca. 900 nm.

ABS graft polymer 5 (component II))

ABS polymer produced by suspension polymerisation, having a rubber content of ca. 15 wt. % (styrene:acrylonitrile weight ratio=74:26) and a mean particle diameter of the rubber phase of ca. 800 nm.

Resin component I (component III))

Statistical styrene/acrylonitrile copolymer (styrene:acrylonitrile weight ratio 72:28) having a $M_W$ of ca. 85 000 and $M_W/M_n-1 \leq 2$, obtained by free radical solution polymerisation.

Moulding compositions

The aforedescribed polymer components are mixed in the proportions given in Table 1 with 2 parts by weight of ethylene diamine bis-stearylamide and 0.1 part by weight of a silicone oil in an internal mixer, and after granulation are processed into test specimens and a flat sheet (in order to evaluate the surface).

The following data were determined:

Notched impact strength at room temperature ($a_k^{RT}$) and at −40° C. ($a_k$−40° C.) according to ISO 180/1A (unit: $kJ/m^2$), ball indentation hardness ($H_c$) according to DIN 53 456 (unit: $N/mm^2$), flow characteristics by measuring the necessary injection pressure at 240° C. (unit: bar) (see F. Johannaber, Kunststoffe 74 (1984), 1, pp. 2–5), and gloss behaviour according to DIN 67 530 at a reflection angle of 20° C. (reflectometer value).

From the examples (test data, see Table 2) it is evident that the moulding compositions according to the invention are characterised by extremely good toughness values, especially at low temperatures, while retaining the other properties (in particular good thermoplastic processability and low level of gloss).

TABLE 1

Formulation of the moulding compositions

| Example | ABS graft polymer I (parts by wt.) | ABS graft polymer 2 (parts by weight) | ABS graft polymer 3 (parts by wt.) | ABS graft polymer 4 (parts by wt.) | ABS graft polymer 5 (parts by wt.) | Resin component 1 (parts by wt.) |
|---|---|---|---|---|---|---|
| 1 | 10 | — | — | 90 | — | — |
| 2 | 20 | — | — | 80 | — | — |
| 3 | 30 | — | — | 70 | — | — |
| 4 (comparison) | — | 10 | — | 90 | — | — |
| 5 (comparison) | — | 20 | — | 80 | — | — |
| 6 (comparison) | — | 30 | — | 70 | — | — |
| 7 (comparison) | — | — | 10 | 90 | — | — |
| 8 (comparison) | — | — | 20 | 80 | — | — |
| 9 (comparison) | — | — | 30 | 70 | — | — |
| 10 | 20 | — | — | — | 80 | — |
| 11 | 30 | — | — | — | 70 | — |
| 12 (comparison) | — | 20 | — | — | 80 | — |
| 13 (comparison) | — | 30 | — | — | 70 | — |
| 14 (comparison) | — | — | 20 | — | 80 | — |
| 15 (comparison) | — | — | 30 | — | 70 | — |
| 16 | 20 | — | — | 60 | — | 20 |
| 17 (comparison) | — | 20 | — | 60 | — | 20 |
| 18 (comparison) | — | — | 20 | 60 | — | 20 |
| 19 | 20 | — | — | — | 60 | 20 |
| 20 (comparison) | — | 20 | — | — | 60 | 20 |
| 21 (comparison) | — | — | 20 | — | 60 | 20 |

TABLE 2

Test data on the moulding compositions

| Example | $a_k^{RT}$ (kJ/m$^2$) | $a_k^{-40°\,C.}$ (kJ/m$^2$) | $H_c$ (N/mm$^2$) | Injection pressure (bar) | Level of gloss |
|---|---|---|---|---|---|
| 1 | 35,9 | 15,6 | 76 | 172 | 72 |
| 2 | 43,1 | 26,5 | 68 | 182 | 72 |
| 3 | 45,7 | 30,2 | 59 | 189 | 67 |
| 4 (comparison) | 32,5 | 11,4 | 73 | 175 | 70 |
| 5 (comparison) | 35,3 | 14,8 | 66 | 184 | 70 |
| 6 (comparison) | 38,3 | 19,6 | 56 | 190 | 71 |
| 7 (comparison) | 31,8 | 10,9 | 77 | 171 | 67 |
| 8 (comparison) | 33,7 | 14,5 | 68 | 178 | 73 |
| 9 (comparison) | 30,6 | 18,4 | 59 | 182 | 71 |
| 10 | 37,6 | 23,4 | 61 | 169 | 66 |
| 11 | 39,9 | 27,7 | 59 | 179 | 69 |
| 12 (comparison) | 34,5 | 15,2 | 60 | 170 | 66 |
| 13 (comparison) | 35,1 | 15,1 | 56 | 181 | 71 |
| 14 (comparison) | 33,9 | 13,0 | 61 | 169 | 53 |
| 15 (comparison) | 32,4 | 15,9 | 58 | 173 | 70 |
| 16 | 40,1 | 18,7 | 80 | 163 | 72 |
| 17 (comparison) | 32,4 | 11,0 | 76 | 164 | 73 |
| 18 (comparison) | 30,0 | 10,4 | 79 | 159 | 78 |
| 19 | 32,6 | 13,9 | 73 | 153 | 72 |
| 20 (comparison) | 28,1 | 8,7 | 70 | 155 | 73 |
| 21 (comparison) | 27,3 | 9,8 | 72 | 147 | 69 |

I claim:

1. A thermoplastic moulding composition comprising:

I) at least one graft polymer obtained by an emulsion polymerisation of styrene and arcylonitrile in a weight ratio of 90:10 to 50:50, wherein the styrene and/or the acrylonitrile can be wholly or partially replaced by α-methyl styrene, methyl methacrylate or N-phenyl maleimide, in the presence of a mixture of a butadiene polymer latex (A) having a particle diameter $d_{50}$ of $\leq 320$ nm, a particle diameter distribution width of 30 to 100 nm when measured as $d_{90}-d_{10}$ of the overall particle diameter distribution, and a gel content of $\leq 70\%$, and a butadiene polymer latex (B) having a particle diameter $d_{50}$ of $\geq 370$ nm, a particle diameter distribution width of 50 to 500 nm when measured as $d_{90}-d_{10}$ of the overall particle diameter distribution, and a gel content of $\geq 70$ wt. %, the butadiene polymer latices in each case containing 0 to 50 wt. % of a further vinyl monomer incorporated by copolymerisation and the mass ratio of graft monomers used to butadiene polymers used being 25:75 to 70:30, II) at least one graft polymer obtained by a solution, bulk or suspension polymerisation of styrene and acrylonitrile in a weight ratio of 90:10 to 50:50, the styrene and/or the acrylonitrile being optionally replaced wholly or partially by α-methyl styrene, methyl methacrylate or N-phenyl maleimide, in the presence of a rubber, the rubber containing 0 to 50 wt. % of a further vinyl monomer incorporated by copolymerisation and the mass ratio of graft monomers used to rubber used being 50:50 to 97:3, and optionally III) at least one rubber-free copolymer of styrene and acrylonitrile in a weight ratio of 90:10 to 50:50, the styrene and/or the acrylonitrile being optionally replaced wholly or partially by α-methyl styrene, methyl methacrylate or N-phenyl maleimide.

2. A thermoplastic moulding composition according to claim 1, wherein the graft polymer I) is prepared by adding the monomers to the mixture of the butadiene polymer latices (A) and (B) such that 55 to 90 wt. % of the monomers are added within the first half of the monomer addition time.

3. A thermoplastic moulding composition comprising:

I) at least one graft polymer obtained by an emulsion polymerisation of styrene and acrylonitrile in a weight ratio of 90:10 to 50:50, wherein the styrene and/or the acrylonitrile can be wholly or partially replaced by α-methyl styrene, methyl methacrylate or N-phenyl maleimide, in the presence of a mixture of a butadiene polymer latex (A) having a particle diameter $d_{50}$ of 260 to 310 nm, a particle diameter distribution width of 40 to 80 nm when measured as $d_{90}-d_{10}$ of the overall particle diameter distribution, and a gel content of 40 to 65 wt. %, and a butadiene polymer latex (B) having a particle diameter $d_{50}$ of 380 to 450 nm, a particle diameter distribution width of 100 to 400 nm when measured as $d_{90}-d_{10}$ of the overall particle diameter distribution, and a gel content of 75 to 90 wt. %, the butadiene polymer latices in each case containing 0 to 50 wt. % of a further vinyl monomer incorporated by copolymerisation and the mass ratio of graft monomers used to butadiene polymers used being 25:75 to 70:30, II) at least one graft polymer obtained by a solution, bulk or suspension polymerisation of styrene and acrylonitrile in a weight ratio of 90:10 to 50:50, the styrene and/or the acrylonitrile being optionally replaced wholly or partially by α-methyl styrene, methyl methacrylate or N-phenyl maleimide, in the presence of a rubber, the rubber containing 0 to 50 wt. % of a further vinyl monomer incorporated by copolymerisation and the mass ratio of graft monomers used to rubber used being 70:30 to 95:5, and optionally, III) at least one rubber-free copolymer of styrene and acrylonitrile in a weight ratio of 90:10 to 50:50, the styrene and/or the acrylonitrile being optionally replaced wholly or partially by α-methyl styrene, methyl methacrylate or N-phenyl maleimide.

4. A thermoplastic moulding composition according to claim 3, wherein the graft polymer I) is prepared by adding the monomers to the mixture of the butadiene polymer latices (A) and (B) such that 60 to 80 wt. % of the monomers are added within the first half of the monomer addition time.

5. A thermoplastic moulding composition according to claim 1, further including at least one resin selected from the group consisting of an aromatic polycarbonate, an aromatic polyester carbonate, a polyester and a polyamide.

6. A moulding prepared from the thermoplastic moulding composition according to claim 1.

* * * * *